United States Patent [19]

Omure et al.

[11] Patent Number: 5,070,113
[45] Date of Patent: Dec. 3, 1991

[54] BLOWING COMPOSITIONS

[75] Inventors: Yukio Omure; Kisuke Kitano, both of Osaka, Japan

[73] Assignee: Daikin Industries, Ltd., Osaka, Japan

[21] Appl. No.: 533,352

[22] Filed: Jun. 5, 1990

[30] Foreign Application Priority Data

Jun. 5, 1989 [JP] Japan .................................. 1-143335
Jun. 12, 1989 [JP] Japan .................................. 1-149147

[51] Int. Cl.$^5$ ............................................... C08J 9/14
[52] U.S. Cl. ..................................... 521/131; 252/172; 252/364; 252/DIG. 9; 521/910; 521/98
[58] Field of Search ......................... 521/131, 98, 910; 252/172, 364, DIG. 9

[56] References Cited

U.S. PATENT DOCUMENTS 4,030,994  6/1977  Kollonitsch .................... 204/157.79
4,148,716  4/1979  Paraskos et al. .................... 208/177

Primary Examiner—Morton Foelak
Attorney, Agent, or Firm—Larson and Taylor

[57] ABSTRACT

The invention provides:
a blowing composition for producing foamed articles of polyurethane comprising at least one of chloropentafluoropropane and isomer thereof,
a blowing composition for producing foamed articles of polyurethane comprising (a) at least one of chloropentafluoropropane and isomers thereof and (b) 1,1-dichloro-1-fluoroethane and
a blowing composition for producing foamed articles of polyurethane comprising (a) at least one of chloropentafluoropropane and isomers thereof and (c) at least one of dichlorotrifluoroethane and isomers thereof.

2 Claims, 2 Drawing Sheets

BLOWING COMPOSITIONS

This invention relates to blowing compositions for producing foamed articles of polyurethane.

Various blowing agents are known for producing polyurethane foam. For example, Japanese Unexamined Patent Publication No.46005/1977 discloses a ternary blowing composition comprising trichlorofluoromethane (R-11), i-pentane and methylene chloride. However, the ternary blowing composition is low in stability and tends to change it properties during storage. The degenerated composition causes poor expansion rate, lowered properties of polyurethane foam, etc.

In recent years, it has been pointed out that some chlorofluorohydrocarbons, when released into the atmosphere, would deplete the stratospheric ozone layer, thereby inflicting a serious adverse influence on the ecosystem including humans on the earth. A worldwide agreement, "The Montreal Protocol," signed on September, 1987, calls for a restriction of consumption and production of the major ozone-depleting chlorofluorohydrocarbons. Among the chlorofluorohydrocarbons to be controlled for restriction is R-11. In consequence, there is an urgent demand for novel blowing agents which have little or no influence on the ozone layer.

1,1-dichloro-1-fluoroethane (R-141b) is a promising candidate substitute for R-11 to minimize ozone depletion, but it has a drawback of being highly inflammable. Further, R-141b attacks some plastics such as ABS resin and the like which are widely used in the components of refrigerators, etc.

We conducted extensive research to develop a novel blowing agent which can produce an expanded or foamed article of polyurethane having improved properties and which, if released into the atmosphere, would exert little influence on the ozone layer. Our research revealed that a composition comprising (a) at least one of R-235 and isomers thereof, a composition comprising (a) at least one of R-235 and isomers thereof and (b) R-141b and a composition comprising (a) at least one of R-235 and isomers thereof and (c) at least one of dichlorotrifluoroethane (R-123) and isomers thereof exhibit excellent properties as a blowing agent for producing polyurethane foam. Particularly, the properties of binary compositions are totally unexpected from the properties of a single component of the compositions.

The present invention provides a blowing agent for producing polyurethane foam comprising chloropentafluoropropane (hereinafter referred to as Composition I).

The present invention provides a blowing agent for producing polyurethane foam comprising chloropentafluoropropane and 1,1-dichloro-1,1-fluoroethane (hereinafter referred to as Composition II).

The present invention also provides blowing agent for producing polyurethane foam comprising a chloropentafluoroethane and dichlorotrifluoroethane (hereinafter referred to as Composition III).

Compositions I, II and III of the present invention will be described below in more detail with reference to the accompanying drawings.

I. Composition I

Figure 1:
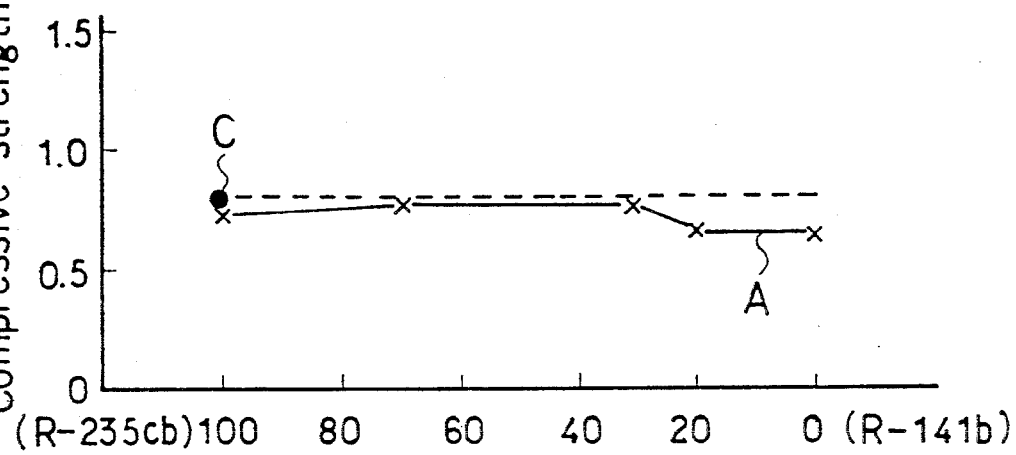
FIG. 1 shows a graph indicating relationship between the compressive strengths of foamed products and the Compositions I and II used.

Chloropentafluoropropane to be used in Composition I can be any of the isomers given below or a mixture of two or more of them.

(1) 1-Chloro-2,2,3,3,3-pentafluoropropane (R-235cb); boiling point=27° C.

(2) 3-Chloro-1,2,2,3,3-pentafluoropropane (R-235cc); boiling point=36° C.

(3) 1-Chloro-1,2,2,3,3-pentafluoropropane (R-235ca); boiling point=44° C.

(4) 1-Chloro-1,1,3,3,3-pentafluoropropane (R-235fa); boiling point=28° C.

The best result is obtained when R-235cb is used as the chloropentafluoropropane.

II. Composition II

Chloropentafluoropropane to be used in Composition II are the same as in Composition I.

Composition II usually comprises about 80 to about 30% by weight of chloropentafluoropropane (hereinafter simply referred to as R-235 unless otherwise required) and about 20 to about 70% by weight of R-141b. When the ratio of R-235 is more than 80%, the compatibility of the composition with polyol is reduced and the composition is difficult to use as blowing agent. When the ratio of R-141b is more than 70%, the composition will become highly inflammable and the foamed articles tend to be low in strength and size stability. Of Composition II composed of R-235 and R-141b, a preferred one comprises about 70 to about 40% by weight of the former and about 30 to about 60% by weight of the latter.

The best result is obtained when R-235cb is used as the chloropentafluoropropane component.

III. Composition III

Chloropentafluoropropanes to be used in Composition III are the same as in Composition I. R-235cb is most preferable also in Composition III.

Dichlorotrifluoroethane to be used in Composition III can be any of the isomers shown below or a mixture of them.

(1) 1,1-dichloro-2,2,2-trifluoroethane (R-123); boiling point=27.5° C.

(2) 1,2-dichloro-1,2,2-trifluoroethane (R-123a); boiling point=29.6° C.

(3) 2,2-dichloro 1,1,2-trifluoroethane (R-123b)

R-123 is preferable to obtain better results.

Composition III usually comprises about 90 to about 20% by weight of R-235 and about 10 to about 80% by weight of dichlorotrifluoroethane (hereinafter simply referred to as R-123 unless otherwise required). If the ratio of R-235 is more than 90% by weight, the compatibility of the composition with polyol is reduced and the composition cannot achieve the desired effect as blowing agent. When the ratio of R-123 is more than 80%, the composition will be more inflammable and the expanded products tend to be low in strengths and size stability. Composition III preferably comprises about 80 to about 40% by weight of R-235 and about 20 to about 60% by weight of R-123.

Compositions I, II and III are relatively stable in use under mild conditions. Compositions I, II and III can contain a stabilizer which will improve chemical stability under severe conditions. Examples of stabilizers are given below.

Alkenyl group containing compounds having at least one double bond such as 1,4-hexadiene, allene, 1,3-butadiene, isoprene, 1,3-pentadiene, β-myrcene, isopropenyl toluene, butadiene, alloocimene,

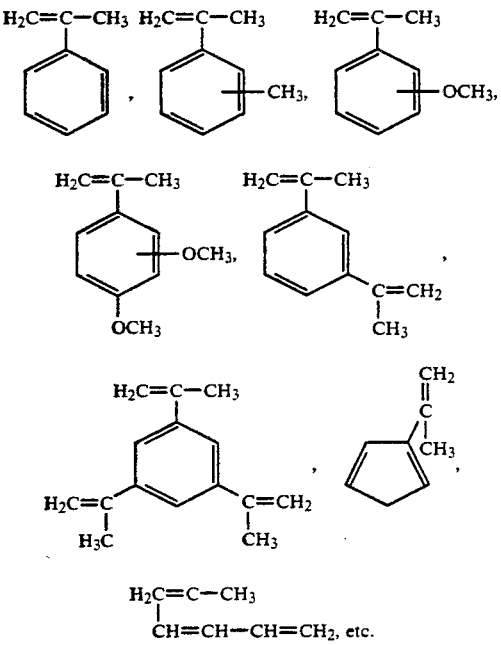

Epoxy group containing compounds such as ethyleneglycol diglycidyl ether, hexanediol diglycidyl ether, neopentylglycol diglycidyl ether, trimethylpropane triglycidyl ether, glycerine polyglycidyl ether, glycid-(2-nitro-phenylether), glycid-(2-nitro-4-chloro-phenylether), glycid-(2-4-vinyl-phenylether), glycid-(4-isopropenyl-phenylether), 1,3-butadienyl glycidylether, 3-methyl-1,3-butadienyl glycidylether, 3-vinyl-1,3-butadienyl glycidylether, glycidyl benzoate, glycidyl acrylate, glycidyl furancarboxylate, N,N-diglycidyl aniline, phenyl glycidyl ether, p-isopropenyl glycidyl ether, p-nitrophenyl glycidyl ether, etc.

Acrylates and methacrylates such as 2-hydroxyethylmethacrylate, diethyleneglycolmonoethylmethacrylate, methoxypolyethyleneglycolmonoethylmethacrylate, etc.

Polyalkoxymethacrylates such as polyethyleneglycolmonoethylmethacrylate, polypropyleneglycolmonoethylmethacrylate, etc.

Phenols such as 2,6-di-t-butyl-p-cresol, thymol, p-t-butylphenol, eugenol, isoeugenol, butylhydroxyanisol, t-butylcyanidol, 2,5-di-t-butylhydroquinone, etc.

Alkylene carbonates such as propylene carbonate, 1,2-butylene carbonate, stylene carbonate, vinylethylene carbonate, phenylethylene carbonate, etc.

Nitro compounds such as nitromethane, nitroethane, nitropropane, nitrobenzene, etc.

Benzophenones such as t-butylchlorobenzophenone, isoanylbenzophenone, etc.

Benzotriazoles such as hydroxybenzotriazole, hydroxymethylbenzotriazole, 2-(3',5'-di-t-butyl-2'-hydroxyphenyl) benzotriazole, etc.

Phenyl salicylates such as phenyl salicylate, p-octylphenyl salicylate, etc.

These stabilizers are usable singly or at least two of them can be used in mixture. Although variable with the kind of stabilizer, the kind of blowing agent, etc., the amount of stabilizer is usually about 0.05 to about 5% by weight, preferably about 0.2 to about 1.0% by weight, of the amount of blowing agent.

The blowing agents of the invention are used in the same manner as the conventional blowing agent such as a ternary composition disclosed in the above-mentioned Japanese Unexamined Patent Publication No. 46005/1977.

R-235, R-141b and R-123 are relatively easily decomposable before they reach the ozone layer in the stratosphere and hardly cause the destruction of ozone layer.

Composition II comprising R-235 and R-141b is safe to use because it is nonflammable or hardly inflammable as a whole while R-141b itself is inflammable.

Composition II comprising R-235 and R-141b and Composition III comprising R-235 and R-123 are usable in contact with plastics materials because both compositions are less corrosive to plastics than R-141b alone or R-123 alone.

Compositions II and III are highly compatible with polyols and the premix comprising Composition II or III and polyol is highly stable.

Expanded or foamed bodies produced with use of the blowing agent of the invention have improved mechanical strengths and size stability.

Given below are examples and comparison examples to clarify the feature of the invention.

EXAMPLE 1

Stability of a premix (a mixture consisting of Composition I or II and a polyol) was evaluated in the following manner.

A 30 g quantity of mixture of Composition I or II and a polyol was placed in a closed glass bottle (50 ml in volume) and stirred with a stirrer for 10 minutes and left to stand for 5 hours at room temperature.

The stability of each of mixtures is given in Table 1 as a degree of phase separation according to the following criteria.

A ... No phase separation and good compatibility
B ... Phase separation and poor compatibility

TABLE 1

| Composition I or II | | Composition I or II/Polyol | |
|---|---|---|---|
| R-235cb/R-141b | Polyol* | 25/75 | 40/60 |
| 100/0 | (a) | A | A |
| 70/30 | (a) | A | A |
| 50/50 | (a) | A | A |
| 30/70 | (a) | A | A |
| 100/0 | (b) | A | A |
| 70/30 | (b) | A | A |
| 50/50 | (b) | A | A |
| 30/70 | (b) | A | A |
| 100/0 | (c) | A | A |
| 70/30 | (c) | A | A |
| 50/50 | (c) | A | A |

TABLE 1-continued

| Composition I or II | | Composition I or II/Polyol | |
|---|---|---|---|
| R-235cb/R-141b | Polyol* | 25/75 | 40/60 |
| 30/70 | (c) | A | A |

*(a): Modified sucrose polyether (trademark "HS-209", product of Sanyo Kasei Kogyo Kabushiki Kaisha, Japan)
(b): Aromatic amine polyol (trademark "RX-500", product of Sanyo Kasei Kogyo Kabushiki Kaisha, Japan)
(c): Nitrogen-containing polyol (trademark "NP300", product of Sanyo Kasei Kogyo Kabushiki Kaisha, Japan)

The results in Table 1 show that Compositions I and II have good compatibility with polyols and can form stable premix with polyols.

EXAMPLE 2

A premix composition was prepared using the components shown in table 2 below.

TABLE 2

| Polyol*[1] | 100 parts by weight |
|---|---|
| Catalyst*[2] | 1.3 parts by weight |
| Silicone foam stabilizer*[3] | 2.0 parts by weight |
| Water | 0.5 parts by weight |
| Composition I or II*[4] | 34–50 parts |

*[1]Polyol (b) used in Example 1
*[2]Trademark "U-CAT 1000", product of Sunapro Kabushiki Kaisha, Japan
*[3]Trademark "SH-193", product of Toray Kabushiki Kaisha, Japan
*[4]An amount equal to malar weight of 40 parts by weight of R-11

To the premix obtained was admixed 135 parts by weight of isocyanate with vigorous stirring and the mixture was poured into a blowing box (350 mm × 350 mm × 300 mm) to produce an expanded body.

Figure 2:
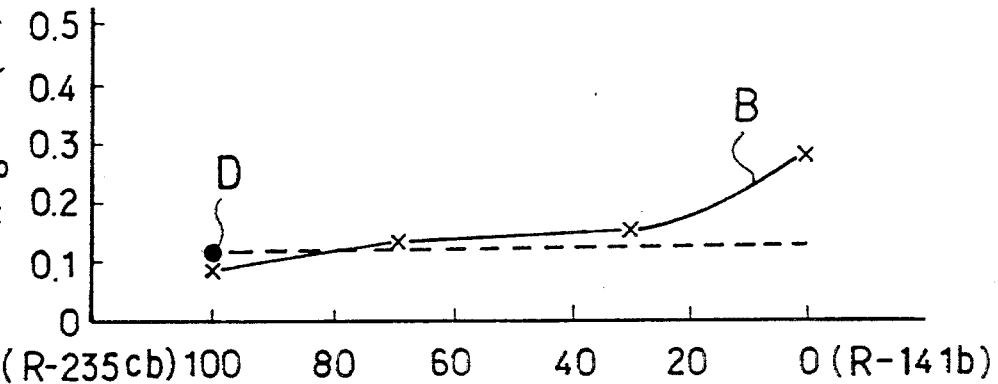
FIG. 2 shows a graph indicating relationship between the shrinkage of foamed products and Compositions I and II used.

The compressive strength and shrinkage percentage (stability at low temperature) of the bodies are shown as line A and line B in FIG. 1 and FIG. 2, respectively.

The dots C and D in FIGS. 1 and 2 indicate the results obtained when R-11 alone is used as blowing agent.

The foamed bodies obtained by using the blowing agents of the invention are superior to those obtained by using R-141b alone and substantially equal to those produced by using R-11.

EXAMPLE 3

Using mixtures of R-235cb and R-141b in varying ratios, the influence of Compositions I and II of the invention on plastics (weight increase by swelling of the material) was inspected.

Immediately after a test piece of plastics (5 mm × 50 mm × 2 mm) was immersed and kept in a mixture at 50° C. for 1 hour, the test piece was weighed to find the weight increase. The results are given in Table 3 below.

The plastics used were as follows.
(a) ... polyvinyl chloride
(b) ... acrylonitrile-butadiene-styrene copolymer
(c) ... polycarbonate
(d) ... polypropylene

TABLE 3

| Ratio | Weight increase (%)* | | | |
|---|---|---|---|---|
| R-235cb/R-141b | (a) | (b) | (c) | (d) |
| 70/30 | A | A | A | A |
| 50/50 | A | A | A | A |
| 30/70 | A | A | A | B |
| 20/80 | B | C | C | B |
| 100/0 | A | A | A | A |

TABLE 3-continued

| Ratio | Weight increase (%)* | | | |
|---|---|---|---|---|
| R-235cb/R-141b | (a) | (b) | (c) | (d) |
| 0/100 | B | C | C | C |

*A: Increase of less than 3%
B: Increase of 3% to 5%
C: Increase of more than 5%

The results in Table 3 show that Compositions I and II of the Invention are low in the ability to dissolve plastics.

EXAMPLE 4

Stability of a premix (a mixture consisting of Composition III and a polyol) was evaluated in the same manner as in Example 1.

The results are given in Table 4.

TABLE 4

| Composition III | | Composition III/ Polyol | |
|---|---|---|---|
| R-235cb/R-123 | Polyol | 25/75 | 40/60 |
| 80/20 | (a) | A | A |
| 60/40 | (a) | A | A |
| 30/70 | (a) | A | A |
| 80/20 | (b) | A | A |
| 60/40 | (b) | A | A |
| 30/70 | (b) | A | A |
| 80/20 | (c) | A | A |
| 60/40 | (c) | A | A |
| 30/70 | (c) | A | A |

The polyols (a) to (c) used and the criteria shown in Table 4 are the same as in Example 1.

The results in Table 4 reveal that Compositions III exhibit excellent compatibility with polyols and form stable premix with polyols.

EXAMPLE 5

A premix composition was prepared with use of components shown in Table 5 below.

TABLE 5

| Polyol*[1] | 100 parts by weight |
|---|---|
| Catalyst*[2] | 1.3 parts by weight |
| Silicone foam stabilizer*[3] | 2.0 parts by weight |
| Water | 0.5 parts by weight |
| Composition III*[4] | 45–50 parts |

*[1]The same as in Example 2
*[2]The same as in Example 2
*[3]The same as in Example 2
*[4]The same as in Example 2

A foamed bodyd was prepared following the procedures of Example 2.

Figure 3:
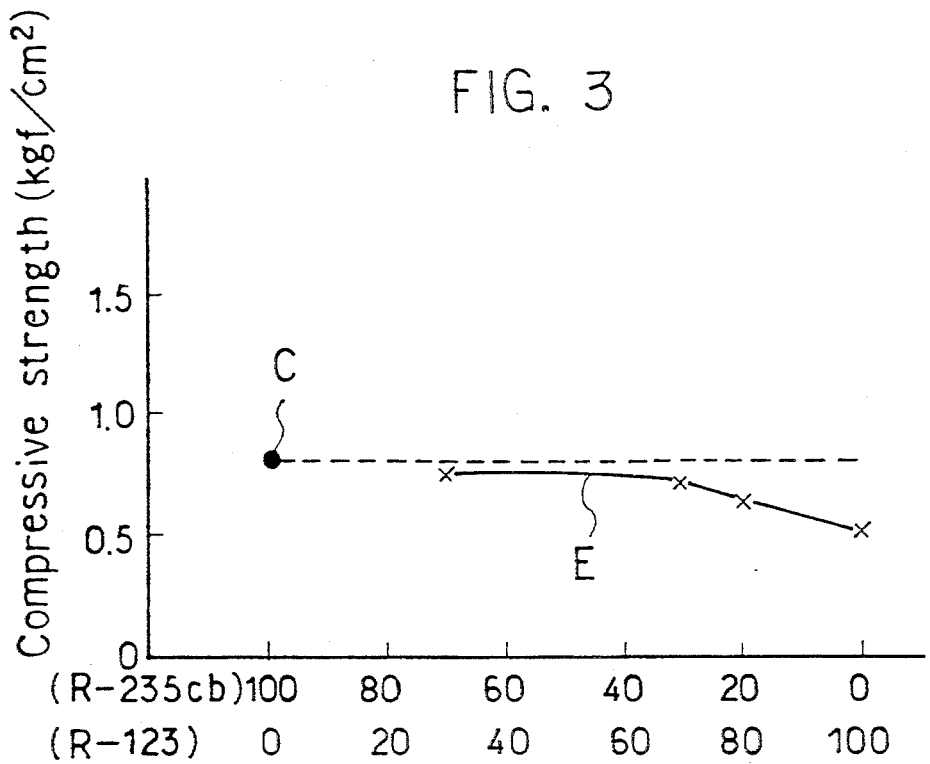
FIG. 3 shows a graph indicating relationship between the compressive strengths of foamed products and Compositions III used.
Figure 4:
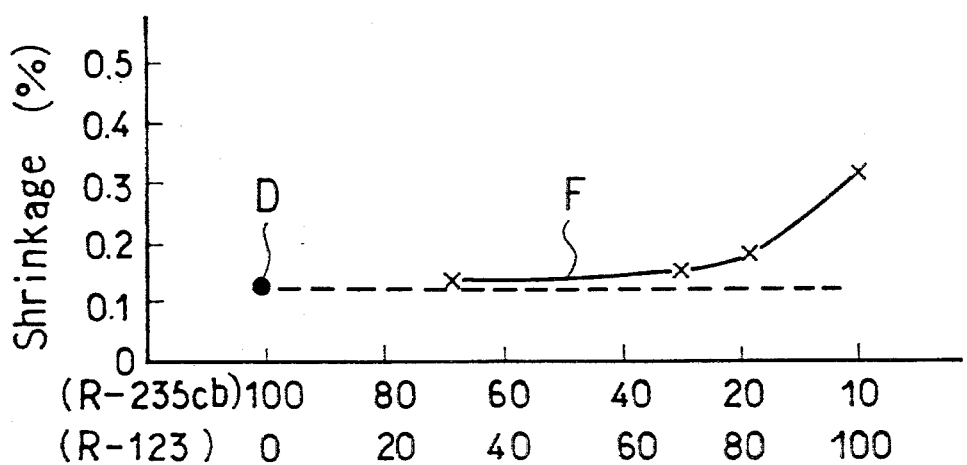
FIG. 4 shows a graph indicating relationship between the shrinkage of foamed products and Compositions III used.

The compressive strength and shrinkage percentage of the foamed bodies produced are given in FIG. 3 and FIG. 4, respectively.

The dots C and D in FIGS. 3 and 4 indicate the results obtained when R-11 alone is used as blowing agent.

The expanded bodies formed by using Compositions III are superior to those obtained by using R-123 alone and substantially equal to those formed by using R-11.

EXAMPLE 6

Using mixtures of R-235cb and R-123 in varying ratios, the influence of Compositions III on plastics was evaluated in the same manner as in Example 3.

The results are given in Table 6 below.

TABLE 6

| Ratio | Weight increase (%) | | | |
|---|---|---|---|---|
| R-235cb/R-123 | (a) | (b) | (c) | (d) |
| 80/20 | A | A | A | A |
| 60/40 | A | A | A | A |
| 30/70 | A | B | A | B |
| 100/0 | A | A | A | A |
| 0/100 | B | C | C | C |

The plastics (a) to (d) tested and the criteria given in Table 6 are the same as in Example 3.

The results in Table 6 indicate that Compositions III are low in the ability to dissolve plastics.

We claim:

1. In a process for producing a foamed body of polyurethane using a blowing agent, an improvement wherein the blowing agent comprises (a) at least one of chloropentafluoropropane and isomers thereof and (b) 1,1-dichloro-1-fluoroethane.

2. In a process for producing a foamed body of polyurethane using a blowing agent, an improvement wherein the blowing agent comprises (a) at least one of chloropentafluoropropane and isomers thereof and (c) at least one of dichlorotrifluoroethane and isomers thereof.

* * * * *